May 12, 1936. O. ANDERSON 2,040,457
SANITARY NEST
Filed Feb. 17, 1932 4 Sheets-Sheet 1
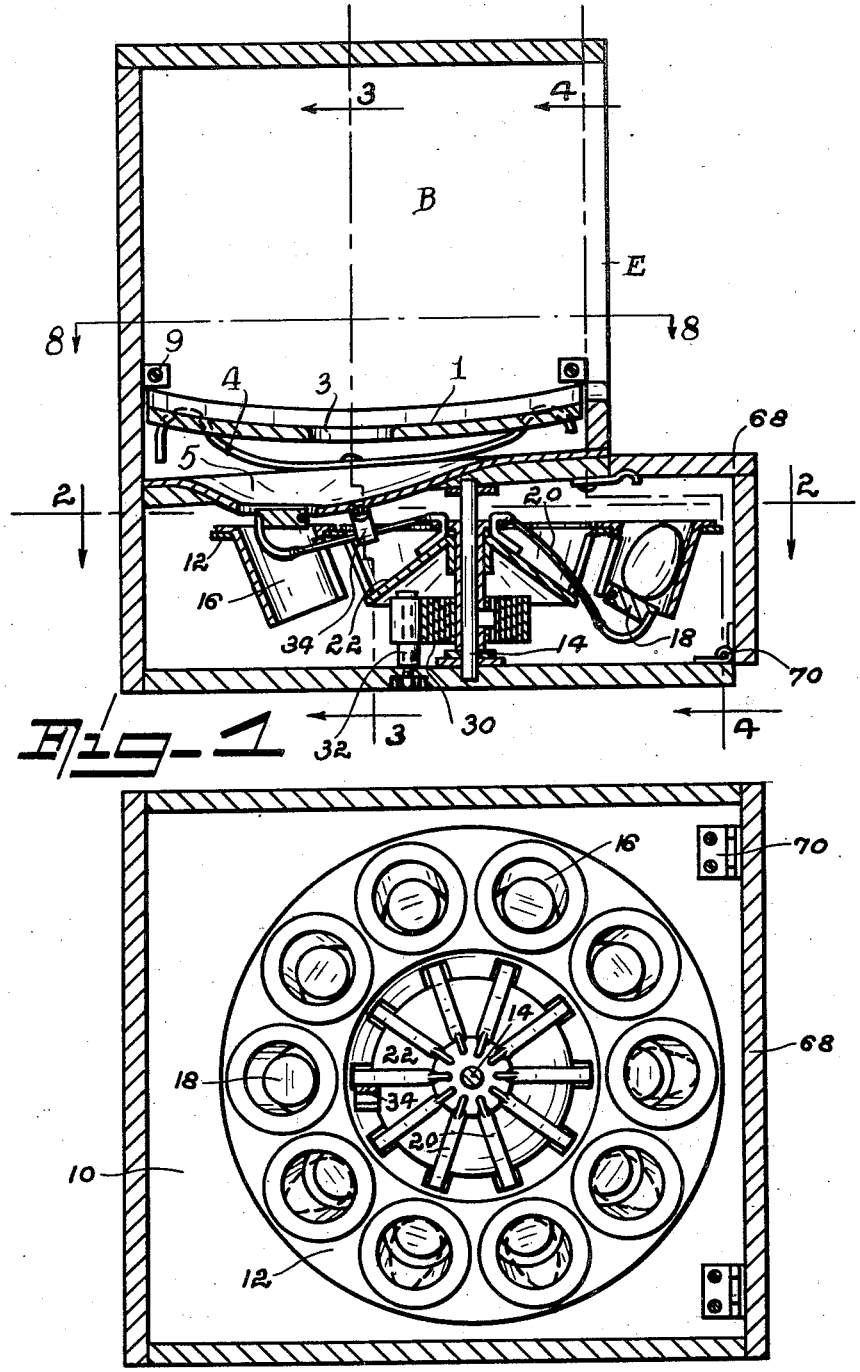
INVENTOR
Otto Anderson
BY
Smith & Tuck
ATTORNEYS

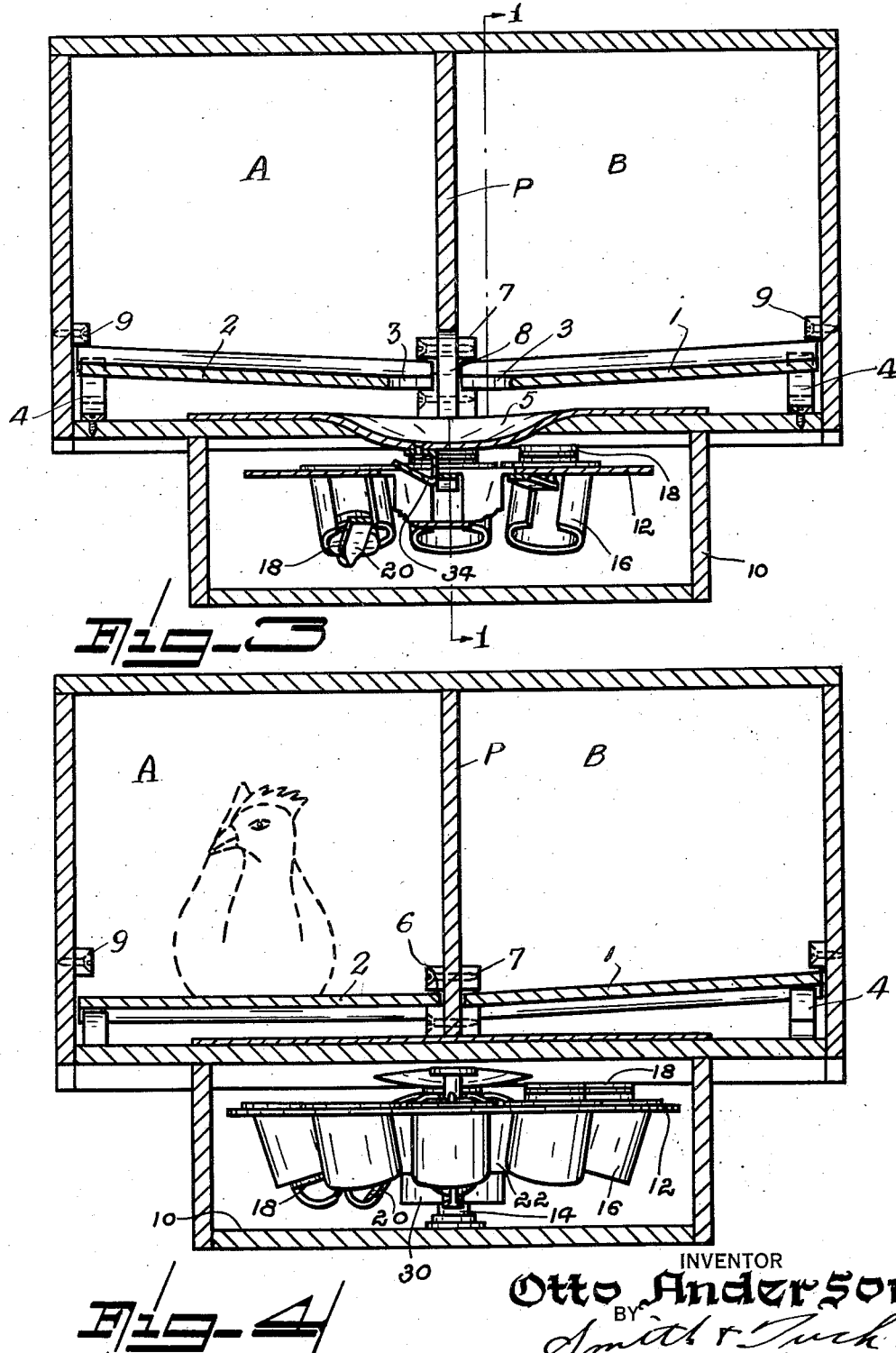

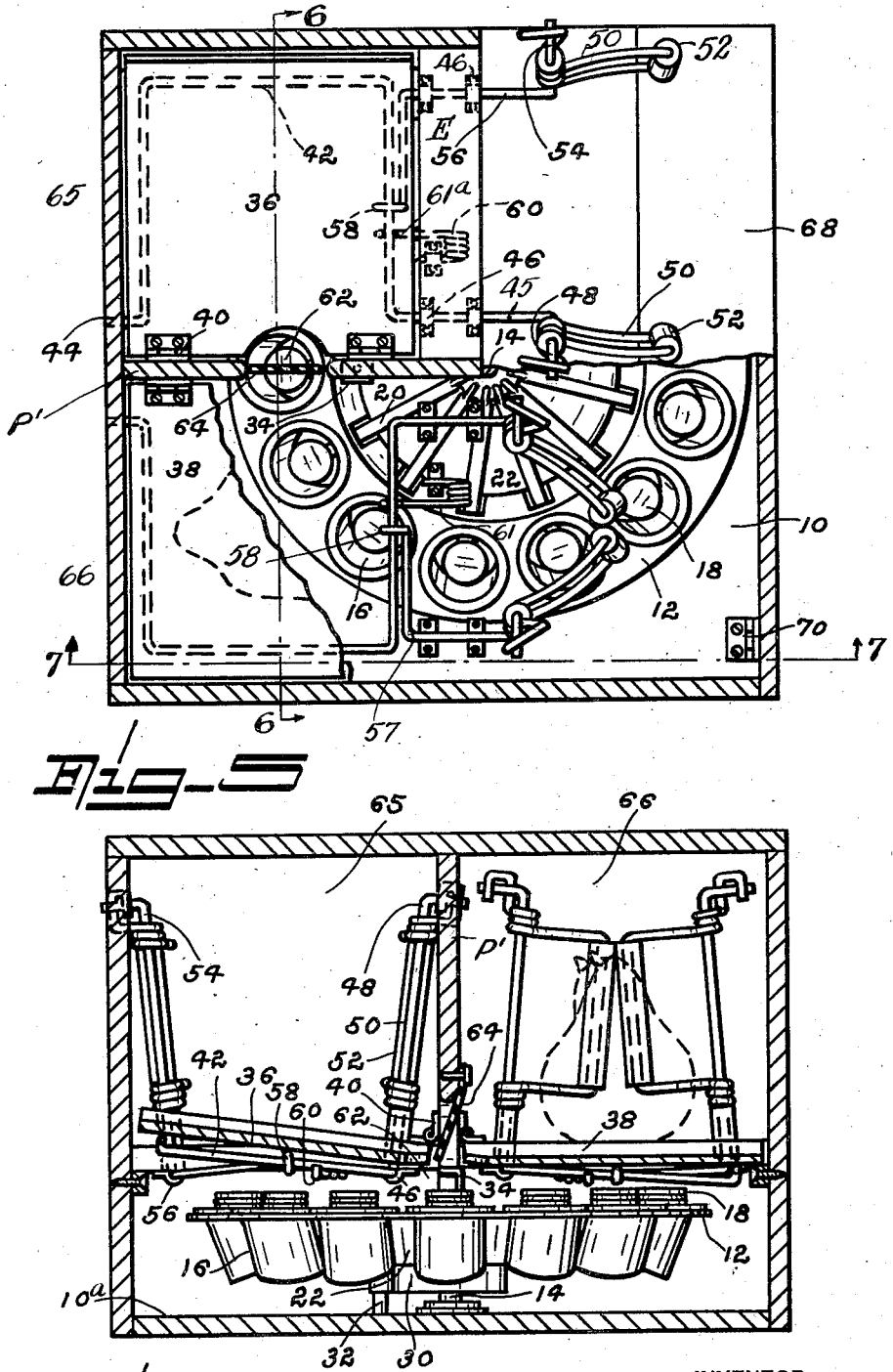

May 12, 1936.　　　　O. ANDERSON　　　　2,040,457
SANITARY NEST
Filed Feb. 17, 1932　　　　4 Sheets-Sheet 4
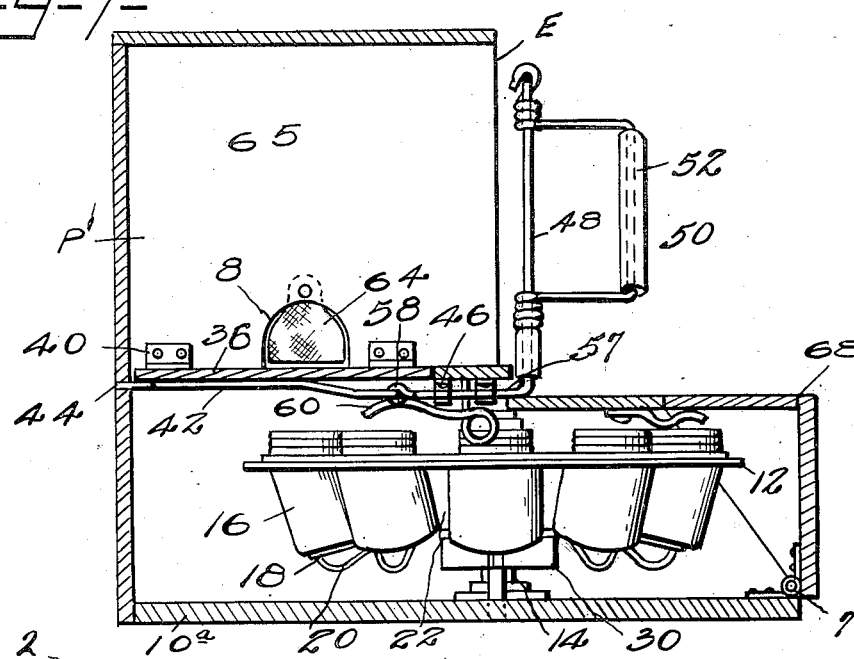
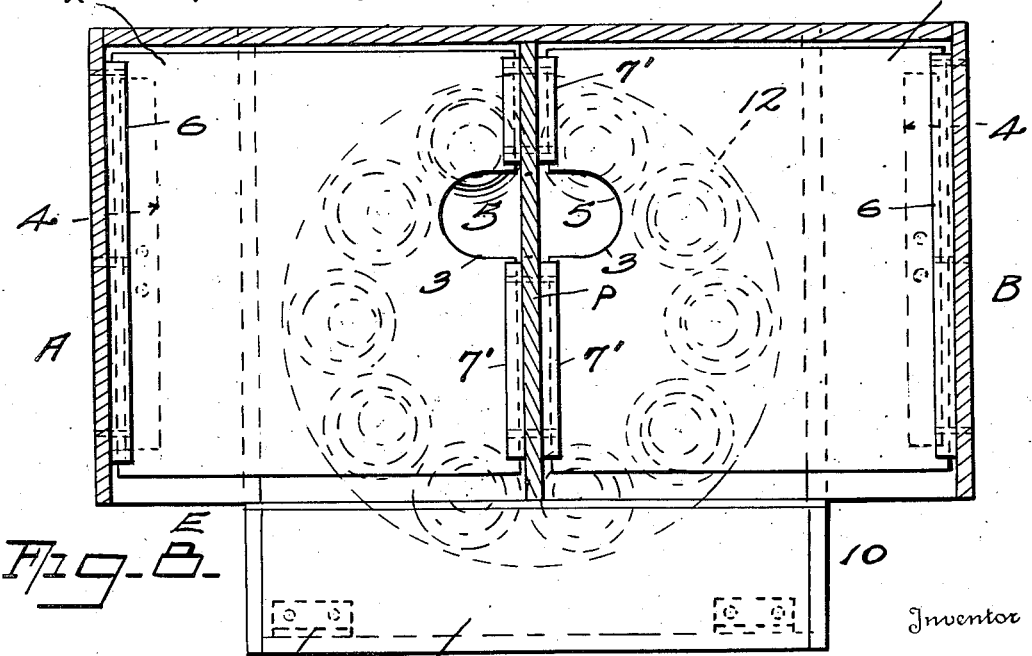
Inventor
Otto Anderson
By Smith + Tuck,
Attorneys Patented May 12, 1936

2,040,457

UNITED STATES PATENT OFFICE 2,040,457

SANITARY NEST

Otto Anderson, Paulsbo, Wash.

Application February 17, 1932, Serial No. 593,640

7 Claims. (Cl. 119—47)

My invention relates to the art of sanitary poultry devices and more particularly to a sanitary nest.

In the past many devices have been arranged for trap nesting and making laying nests on the whole more sanitary. However, there has been an ever pressing need for a device which would take the egg as laid by a hen and remove it from the nest. The necessity for this is due to the fact that where several hens use the same nest, a number of eggs may be laid that will be clean, and then another hen lay an egg which through some improper feeding or some physical defect within the hen itself, may be laid with considerable coloring matter, which might very easily discolor a large number of eggs. It is to provide means that will satisfactorily take care of this condition that I have provided my sanitary nest, therefor.

The principal object of my present invention is to provide a sanitary nest in which each egg is removed from the nest as soon as laid.

A further object is the provision of means that make it impossible for more than one hen to use the nest at the same time.

A further object of my invention is to so arrange the various parts that one discolored egg can not in any way come in contact with others which may be laid clean.

Other and more specific objects will be apparent from the following description taken in connection with the accompanying drawings, wherein I have illustrated two forms of the physical embodiment of my invention.

Figure 1 is a vertical cross sectional view, taken on the line 1—1 of Fig. 3, showing the rotary egg-receiving apparatus, one of the nests, an egg deposited in one receptacle, and another egg receptacle in position to receive an egg.

Figure 2 is a horizontal sectional view of the base of the device, at line 2—2 of Figure 1 disclosing a top plan view of the rotary egg-receiver.

Figure 3 is a longitudinal vertical sectional view as at line 3—3 of Figure 1, disclosing dual nests, the chute between the nest boards and the rotary egg-receiver.

Figure 4 is a longitudinal vertical sectional view, as at line 4—4 of Figure 1.

Figure 5 is a top plan view of a modified form of my invention partly in section and broken away, for convenience in illustrating a dual trap-nest in combination with the rotary egg-receiver, the gates of one trap nest being closed while the gates of the other trap nest are open.

Figure 6 is a vertical sectional view as at line 6—6 of Figure 5.

Figure 7 is a vertical sectional view at line 7—7 of Figure 5. Figure 8 is a horizontal sectional view of the housing at line 8—8 of Figure 1.

Referring to the drawings, throughout which like reference characters indicate like parts, 10 designates the base of my nest unit. Pivotally supported from the base is a turntable member 12. This member may be suitably supported on any centrally supported pivot member as 14, and is arranged to provide a resting place for a plurality of egg receiving receptacles or compartments 16. These receptacles or compartments in turn are provided with bottoms or closing members 18, which are spring supported as by the flat spring members 20 in the present instance. In this connection it must be clearly understood that the tension of spring 20 must be such that the weight of any egg will be sufficient to depress the spring and cause it to contact with the central, conical, elevated support 22, which acts as an abutment for each of the radially arranged springs 20, and limits the downward movement of the cup-bottom 18, as indicated at the right in Figure 1.

It is desired to point out at this time that the small drop would not be sufficient to seriously injure the average egg, but it must be remembered that the average egg that is laid is more or less soft and the shell sets to its maximum hardness upon exposure to air. It is in this condition that the egg must be handled carefully and as a result it has been found very desirable to employ the spring member in order to prevent the egg from dropping on any firm surface.

Disposed about spindle 14, and having one end secured thereto, is a coil spring 30 which has its opposite end secured to a fixed pivot member such as 32. This spring is so disposed after the showing of Figure 1 that it will tend to urge the turntable to revolve in one direction. This revolution is arrested by the stop member 34 which is so disposed as to engage the spring members 20 when they are in their upper position. As an egg is then dropped or rolled upon the closing member or bottom 18, the weight of the egg is sufficient to depress this spring and cause it to slip underneath stop 34. The spring 30 then tends to revolve the turntable and will revolve it until stop 34 engages the spring member 20 of the next receiving chamber.

Having thus described the rotary egg-receiving unit which is located in the hollow base 10 or 10' of the device, and is utilized in the different forms of the invention illustrated in the drawings, reference will now be had to the forms of nests disclosed in the drawings and utilized with the rotary egg-receiving unit.

In Figures 3 and 4 two nests as A and B are shown as separated by a partition P, and in Figures 5 and 6 similar nests are designated 65 and 66, and separated by the dividing partition P or P'. As shown, the nests are constructed over a portion of the top of the base 10 or 10' and they are provided with openings E for entrance and exit of the hens before and after laying the eggs.

In each instance the nests are provided with depressible and resiliently supported floors or nesting boards as 1 and 2 in Figures 1, 3, 4, 8; and 36, 38 in Figures 5 and 6.

In the form shown in Figures 1, 2, 3, 4, and 8 the nesting boards are provided with discharge openings 3, for passage through the board of the egg after it has been laid, and these openings are located in the edges of the two boards 1 and 2 at opposite sides of the partition P.

The nesting boards 1 and 2 are resiliently supported at their outer edges on springs or spring-blades 4 which are secured on the top of the base 10 and located under cleats 6, 6, attached to the side walls of the coops and forming stops for upward movement of the boards. The inner edge of each board, adjacent to the partition P, is loosely supported between a pair of vertically spaced cleats 7 and 7' fastened at the opposite sides of the partition. The openings 3 of the nesting boards are located above a somewhat conical chute 5 supported on the walls of an opening in the top of the base, and the chute is provided with an opening in position for the reception of the resiliently supported cup-bottom 18 of the rotary egg-receiving unit, as indicated in Figure 1. Thus it will be seen that the weight of the hen will depress the nesting board to approximately, horizontal position, against the tension of its spring 4. When the hen, after laying an egg, leaves the nesting board, the spring lifts the outer edge of the board, thus tilting the board, and the egg rolls down through the opening 3 into the chute 5, and is deposited on the up-lifted cup-bottom 18. The weight of the egg now depresses the spring blade 20, releases the rotary egg-receiving unit, and the latter is turned to bring a successive, empty, cup under the chute 5.

In Figures 5 and 6 dual trap-nests are shown mounted above the box or base 10a, which trap nests prevent access to a nest or coop by a second hen when the nest or coop is already occupied. In these figures of the drawings the nesting boards 36 and 38, which are resiliently supported and are depressible, are hinged at 40 at opposite sides of the partition P', and the depressible portions of these boards are resiliently supported by means of U-shaped yokes 42. One end of each yoke is pivoted as at 44 in a wall of the coop, and the other, elongated end 45 of each yoke is pivoted as at 46 on the top of the base 10a.

These elongated ends 45 of the yokes terminate in posts 48 and each post supports a swinging gate as 50 which is provided with a weight 52 at its free end, which weight swings the gate to open or closed position. The posts do not stand perpendicular to the horizontal plane of the top of the base, but are slightly tilted to one side or the other, through movement of the resiliently supported nesting boards 36 and 38.

These gates 50 are preferably used in pairs as indicated, and the gate posts 54 are complementary to the posts 48. The posts 54 are upturned ends of pivot arms or bars 56 that are spaced apart from the complementary elongated ends 45 of the yokes, and these bars 56 are pivoted in bearings 46 similar to the bearings for the elongated ends 45. In order that the posts 54 may also partake of the movements of the yokes, these bars 56 are fashioned with lever arms 57 that terminate in loops 58 and these loops encircle portions of the yokes 42 and fit loosely on the yokes to permit the required movement. A coiled spring 60, anchored to the top of the base engages under each yoke to provide the resilient support for the yoke and for the nesting-board 36 or 38.

Let it be assumed that a hen has entered the nesting compartment and stepped upon floor 36. The first action will be to depress the free end of the hinged depressible floor, this in turn will cause the journal portion 45 of the U-member or yoke 42 to revolve in bearings 44 and 46. This action will in turn cause a change in inclination of the more or less vertically disposed pivot member 48. Now, the position of the pivot member 48 is normally such that it leans away from the plane of the center of the nesting compartment entrance and when so disposed the weights seeking their lower level swing the gates 50 to the open position. When, however, the hen stands on floor 36, the change of inclination brings about the condition illustrated in Figure 6 on the right hand side of the view, in which the posts 48 and 54 are inclined toward the center of the opening. This causes the weights to again seek their lowest level and an effectual closing of the entrance is effected. It is, of course, remaining closed only because of the presence of the weights, and it is thus possible for a hen on the inside of the compartment to press against the weights and have them swing freely open. As the weight of the hen leaves floor 36, the axis of the pivot members is changed to the position indicated on the left hand side of Figure 6, and the weights swing to their open position ready for the entrance of another hen.

It is normally intended that the length of gate members 50 will be such that they can never swing past the line joining the two pivot members so that they prevent any entrance from the outside but still permit exit from the laying compartment. The use of the spring 60 is desirable, in addition to the operation of the gate arrangement, in that as soon as the hen steps off floor 36 the spring-lifted yoke will raise the outer edge of the nesting board and the egg will be rolled down toward the discharge opening 62 similar to the openings 3, 3 in Figures 1 and 3. Here, I have provided, preferably, an upright rubber baffle member 64 located in an opening at the base of the partition P, which the egg rolls against and which arrests its movements. This baffle assists in dropping the egg gently through the discharge opening onto the upper surface of the elevated bottom 18 of an egg-receiving cup 16.

It has been found very desirable to provide two separate nesting chambers as 65 and 66, so that two hens can lay at the same time, and use only the one rotary egg-receiving unit 12. It is particularly desirable under such conditions, to have the baffle member 64 to guard against the remote possibility of two eggs being released at the same time and bumping together.

In order to provide for easily removing the eggs stored in the egg-receiving unit 12, I provide a hinged cover member as 68, which can revolve downwardly about hinge 70 and thus permit ready access to the egg storing cups 16. When it is then desired to remove the eggs, the fingers can be used to raise the bottom closure member 18, and thus make the egg readily available.

One caution should be observed in removing the eggs namely, that the turn table should be revolved as each egg is removed, in the proper direction to wind up the motor spring 30, and thus return to it sufficient tension to properly revolve the turntable as egg is again deposited in it.

The foregoing description and the accompanying drawings are believed to clearly disclose preferred embodiments of my invention but it will be understood that this disclosure is merely illustrative and that such changes in the invention may be made as are fairly within the scope and spirit of the following claims:

Having thus fully described my invention, what I claim as new and desire to secure by Letters Patent is:—

1. In a trap nest, the combination with a spring-lifted, depressible floor, of closure means including a gate post having an angular rock-arm actuated by depression of the floor, a gate pivoted on the post and adapted to rock therewith, and a weight on the gate adapted to swing the gate to open and closed positions with the rocking movement of said arm.

2. In a trap nest, the combination with a spring-supported, depressible floor, of a pair of multiple-movement weight-operated gates, spaced, tiltable posts on which the gates are hinged, angular rock arms rigid with the posts and actuated by the floor, and a weight at the free edge of each gate adapted to swing said gate to open and closed positions with the rocking movement of said arms.

3. In a trap nest, the combination with a spring supported floor, of closure means including a depressible U-shaped support beneath the floor and journal bearings for said support, a rock arm rigid with the U-shaped support, an upright post rigid with said rock arm, a gate hinged on said post and tiltable therewith, and a weight at the free edge of the gate adapted to swing the gate to open and closed positions with the tilting movement of said post.

4. In a nest appliance adapted to deposit eggs successively in receptacles, the combination with a rotary table, a support therefor, and a spring-motor to rotate the table, of a number of egg-receptacles mounted beneath the table and secured thereto to rotate therewith, a bottom-closure for each receptacle, a resilient-blade for each closure, and a stop for successive co-action with said blades.

5. In a nest appliance adapted to deposit eggs successively in receptacles, the combination with an intermittently rotatable table having openings therein, a spindle and its support, and a spring-motor for said spindle, of a number of receptacles mounted beneath and rotatable with the table and having slots therein, a depressible bottom for each receptacle, a resilient blade for each bottom, a central support for said blades in their lowermost positions, and a stop in the path of movement of said blades in their uppermost positions.

6. In a nest appliance adapted to deposit eggs successively in receptacles, the combination with an intermittently rotatable, spring-operated table having openings, a spindle, and a central, cone-shaped housing, of a plurality of slotted receptacles mounted beneath and rotatable with the table, a plurality of spring blades having their inner ends anchored to said housing and movable in the slotted receptacles, depressible bottom-closures at the outer free ends of said blades, and a single stop device mounted on the nest-appliance in the path of movement of said blades when in their uppermost positions.

7. In a nest appliance adapted to deposit eggs successively in receptacles, the combination with a depressible nest having a resilient support and a discharge opening in said nest, and a conveyer chute located beneath said opening and said chute also having an opening, of a rotary table beneath the chute and operating means for rotating the table, a number of egg-receptacles mounted on the table beneath the chute, a bottom closure for each receptacle and depressible under the weight of an egg, resilient means tending to lift said closures to the chute-opening, and a single stop device mounted on the nest appliance in the path of movement of said resilient means when the bottom closures are in their uppermost positions.

OTTO ANDERSON.